(No Model.)

C. W. SIVER.
PIPE HANGER.

No. 544,631.          Patented Aug. 13, 1895.

WITNESSES:
Charles W. Morvin
Jessie O. Murray

INVENTOR
Charles W. Siver.
BY
Smith & Denison
his ATTORNEYS.

UNITED STATES PATENT OFFICE.

CHARLES W. SIVER, OF SYRACUSE, NEW YORK, ASSIGNOR TO THE MANUFACTURERS' AUTOMATIC SPRINKLER COMPANY, OF SAME PLACE.

PIPE-HANGER.

SPECIFICATION forming part of Letters Patent No. 544,631, dated August 13, 1895.

Application filed February 4, 1895. Serial No. 537,242. (No model.)

*To all whom it may concern:*

Be it known that I, CHARLES W. SIVER, of Syracuse, in the county of Onondaga, in the State of New York, have invented new and useful Improvements in Pipe-Hangers, of which the following, taken in connection with the accompanying drawings, is a full, clear, and exact description.

My invention relates to pipe-hangers or slings used in supporting overhead lines of piping and adjustable to be adapted to overcome all inequalities of ceiling-surface, in order to maintain the line of piping at the desired level or grade.

My object is to produce such a pipe-hanger adapted to be used more particularly in supporting lines of piping at a fixed distance below a ceiling, as in supporting the water-pipes of a sprinkling system for putting out fires, in which the piping-lines are maintained upon a grade or level and frequently need to be leveled up or restored to grade on account of the unequal settling of a building under unequal loads or from other causes which throw the piping out of alignment, especially in systems which are known as "dry-pipe," and in which, if at any time any water is let into the piping, such water must be drained out in order to properly restore the air-pressure within the pipes. The hanger-body produced by me is adapted to be used with many sizes of pipes, the slings being varied according to the size of the pipe, means being provided whereby the sling has a sufficient engagement with the hanger to carry the load.

My invention consists in a pipe-hanger having a suitable base and parallel arms thereon and a pipe-support consisting of a rod, bar, or wire bent centrally, so as to partially inclose the pipe, having its ends bent to form offsets, with eyes in the off-sets through which the bolt passes, by which the support is adjustably secured in proper engagement with the arms of the base. It is constructed as follows, reference being had to the accompanying drawings, in which—

Figure 1:
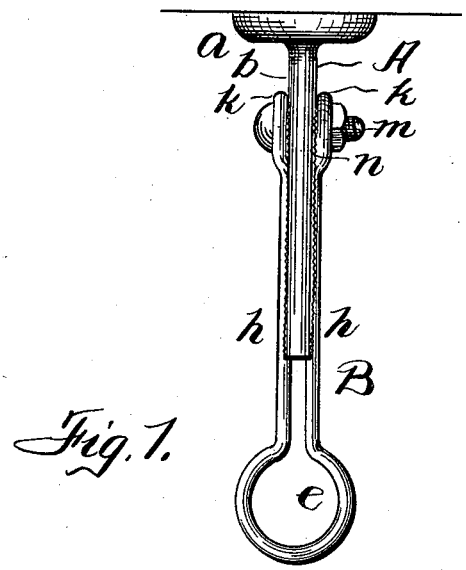
Figure 2:
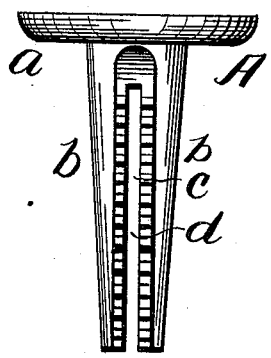
Figure 3:
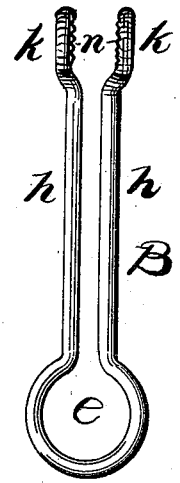

Figure 1 is a side elevation of the hanger and sling. Fig. 2 is a side elevation of the hanger. Fig. 3 is a like view of the sling.

A is the hanger consisting of a base $a$, to which arms $b$ are secured, so as to create a bolt-slot $c$, and the edges of said slot are flattened and provided with teeth $d$, or otherwise roughened or transversely corrugated, said base being provided with screw or bolt holes of any ordinary form suitable to receive the screws or bolts which secure the base in position. The base and arms can be cast in one piece.

B is the sling consisting of a wire or rod bent to form the ring or loop $e$ and the arms $h$, each of said arms having an eye $k$ and an adjacent bend or crook when necessary, and $m$ is a bolt inserted through said eyes and slot and clamping said eyes and more or less of said arms against the edges of the hanger-slot, said arms being provided with teeth or corrugations $n$ or being roughened sufficiently to properly engage with the hanger-teeth and relieve the bolt from the load. While for heavy work said teeth are essential, still for light work they may be reduced in number.

It will be readily seen that the rings $e$ are varied according to the size of the pipe, and that by making the hanger-arms of good length the piping can be hung at varying distances from the ceiling, as when it is desired to have it self-draining, as when the pipes are normally filled with compressed air, in which the pipes are out of a horizontal, and that in case the level or grade of a line of pipe is destroyed by the settling of a building by loosening the bolts successively it can be easily restored to such level or grade.

Having described my invention, what I claim, and desire to secure by Letters Patent, is—

The combination with a hanger consisting of a base and arms thereon having a slotway between them, of a sling consisting of a piece of metal bent to form a loop and having eyes in its ends, the arms slightly approaching each other below the eyes, and means for securing said sling to the arms of the base, as set forth.

In witness whereof I have hereunto set my hand on this 16th day of January, 1895.

CHARLES W. SIVER.

In presence of—
CHARLES U. MARVIN.
HOWARD P. DENISON.